United States Patent [19]

MacFarlane et al.

[11] Patent Number: 5,086,374
[45] Date of Patent: Feb. 4, 1992

[54] APROTIC ELECTROLYTE CAPACITORS AND METHODS OF MAKING THE SAME

[75] Inventors: Douglas R. MacFarlane; Arthur K. Philpott; John R. Tetaz, all of Victoria, Australia

[73] Assignee: Specialised Conductives Pty. Limited, Victoria, Australia

[21] Appl. No.: 526,465

[22] Filed: May 21, 1990

[51] Int. Cl.⁵ ............................................. H01G 9/02
[52] U.S. Cl. ................................... 361/525; 252/62.2
[58] Field of Search ............... 361/502, 523, 524, 525, 361/526, 527; 29/25.03; 252/62.3, 62.2

[56] References Cited

U.S. PATENT DOCUMENTS

| | | | |
|---|---|---|---|
| 3,940,667 | 2/1976 | Pearce | 252/62.3 X |
| 4,786,429 | 11/1988 | Mori et al. | 252/62.2 |
| 4,830,785 | 5/1989 | Shinozaki et al. | 252/62.2 |

Primary Examiner—Donald A. Griffin
Attorney, Agent, or Firm—Gottlieb, Rackman & Reisman

[57] ABSTRACT

An electrolyte for use in a capacitor or a battery comprising a solution of (a) at least one salt selected from the group consisting of alkali metal salts, transiton metal salts, ammonium and ammonium derivatives salts, zinc salts, cadmium salts, mercury salts, lead salts, bismuth salts and thallium salts of (b) at least one acid selected from the group consisting of monobasic, dibasic and tribasic acids (c) in an aprotic solvent substantially free of protic impurities. The acid may be selected from the group consisting of perchloric acid, tetraflouboric acid, thiocyanic acid, trifluoromethanesulphonic acid and haloid acids. The salts may be selected from the group consisting of partial esters of at least one of boric, sulphuric and phosphoric acid reacted with compounds containing an alcohol group or may be an alkali metal tetrafluroborate. The capacitor is stable and has improved linearity, working voltage, capacitance per unit area, shelf life size, leakage current, and internal series resistance. The electrolyte is formed by purifying the aprotic solvent so that it is free of protic impurities and dissolving one or more salts therein. If the salt contains water of hydration, the solution is dried. Electrolytic capacitors, double layer capacitors or batteries are formed.

17 Claims, No Drawings

APROTIC ELECTROLYTE CAPACITORS AND METHODS OF MAKING THE SAME

This invention relates to capacitors which utilize an electrolyte that imparts high stability to the capacitor and to methods of making such capacitors. It relates to electrolytic capacitors and double layer capacitors utilizing such electrolytes. While the applicability of the principles of the present invention is fairly wide and general, for the sake of an orderly presentation, and to facilitate the comprehension of those principles, the description will focus in the first instance on the structural characteristics of and manufacturing methods for electrolytic capacitors which are designed to be used in implantable biomedical electronic devices such as cardiac pacemakers and defibrillators.

Cardiac pacemakers and defibrillators to be implanted inside the human body require associated power supplies which must be provided with a high capacitance in order to be able to deliver intense bursts of current for very short time intervals on demand. That electrolytic capacitors are well suited for performing this function in biomedical electronic devices such as pacemakers and defibrillators is well known. However, there are two main deficiencies in the properties of conventional capacitors in such an application. The first relates to the stability or reliability of the capacitor and the second relates to the volume that the capacitor occupies.

In view of the critical purpose for which the capacitor is used in an implantable medical device, it is imperative that the capacitor have the highest possible stability and reliability. However, conventional capacitors tend to undergo a process known as deforming during long storage with no applied voltage. As is well known, the face of the aluminium anode is coated with a thin layer of aluminium oxide, which constitutes the dielectric for the capacitor and is formed through an electrochemical action resulting from the application of a positive voltage to the anode. However, the continued contact of the oxide layer with the conventional solvent-based liquid or gel electrolyte over a period of time, especially when the capacitor is not in use, tends to cause the oxide layer to become degraded or "deformed" by being dissolved in the electrolyte. As a consequence the shelf life of the capacitor is relatively limited.

Ordinarily the application of a voltage across the capacitor during use would tend to cause the oxide layer to be re-formed. However, the capacity of the electrolyte to support this process is limited. Thus, such a capacitor, in addition to a decreased shelf life, tends to have a shortened useful service life as well. In order to become fully charged on a subsequent application of voltage, a deformed capacitor will draw a significant amount of extra current over and above that required to simply charge the capacitor. This extra, or reforming, current causes the oxide layer to be reformed on the aluminium anode. The energy required to reform the layer is not recoverable from the capacitor on discharging. This reforming current thus represents a loss of energy in the first charge/discharge cycle of the capacitor after long term storage. Such loss of energy is a serious deficiency when the capacitor is used in an implantable defibrillator. In such devices the capacitor is required to remain uncharged for long periods of time, but to be able to be charged rapidly to full operating voltage when defibrillation is required by the patient.

A capacitor that has deformed significantly during the dormant period will require a substantial amount of extra time to reach full voltage when needed. This also represents an extra amount of energy required to charge the capacitor which is not returned on discharge. The batteries in the defibrillator must be given an additional capacity in order to provide this extra energy. The extra time to charge the capacitor also leads to an uncontrollable variation in the time to reach full charge. In certain critical cases this extra delay may prove fatal to the patient. To avoid this problem, defibrillators currently in use may automatically charge the capacitors periodically after implantation, and then dump the energy internally in the device. Such periodical charging to ensure that an adequate state of formation always exists is also wasteful of energy and requires further battery capacity within the defibrillator. The extra battery capacity requires additional volume in the defibrillator and thus increases its size.

By way of example, we have found that 360 Vwdc capacitors supplied by Rubycon ® deform to the extent, during a period of 1000 hours at 60° C., that an additional 40% of the normal charge is required to bring the capacitor to full working voltage. While a device implanted in the body will be maintained at the lower temperature of approximately 37° C., and deforming will generally take place more slowly, 60° c. is used as a standard test temperature.

Given the environment within which the defibrillator is used, it is essential that the volume of the device and its supporting electronics be kept to an absolute minimum. Thus, since the capacitor in such a device ordinarily occupies as much as approximately 30% of the total volume of the device, which is a very high proportion relative to the other electronic components in the device, considerable effort has been expended on the problem of reducing the size of the device as a whole. Nevertheless, attempts to minimize the volume of electrolytic capacitors have met with only limited degrees of success, for a number of reasons. Conventionally, a capacitor of this type includes an etched aluminium foil anode, an aluminium foil or film cathode, and an interposed Kraft paper of fabric gauze spacer impregnated with a solvent-based liquid electrolyte. The entire laminate is rolled up into the form of a substantially cylindrical body and encased, with the aid of suitable insulation, in an aluminium tube which is enclosed with the other electronics in a hermetically sealed case of a suitable metal (such as titanium, for example) inert to body fluids.

In such electrolytic capacitors there exists the risk that the liquid electrolyte will leak out. Accordingly, the capacitor must be hermetically sealed to prevent any leakage of the liquid electrolyte therefrom, since if the liquid were to come into contact with the other electronic components encapsulated in the device, it could damage them sufficiently to cause the device to fail to operate properly. In extreme cases, the patient's life could then be in jeopardy. Hermetically sealing the liquid electrolyte into the capacitor thus has become standard practice, but this also inherently seals in any gases that may become liberated during the use of the capacitor. Aluminium electrolytic capacitors tend to give off hydrogen during use because of the passage of reforming of faradaic current through even a fully formed capacitor. Such hydrogen is generated at the cathode and is a serious environmental risk in many applications. To accommodate such gases and to prevent a potentially harmful buildup thereof, it has become necessary to provide the capacitor with an expansion or compliance chamber into which the gases can be permitted to escape and accumulate so as to avoid their having any adverse effect on the device. That, however, has entailed an increase, rather than a reduction, in the volume of the capacitor and is clearly an unacceptable expedient for use in a device for which minimization of the volume is a critical consideration.

In order to allow the hydrogen to escape from the capacitor most prior art devices leave a small breather hole in the enclosure. This breather hole also allows a small loss of the electrolyte at elevated temperatures. Such electrolyte loss may eventually cause the failure of the capacitor.

In double layer capacitors the voltage range of the capacitor is determined by the point in voltage at each electrode at which some significant electro-chemical reaction begins to take place. This reaction can involve reaction of the solvent in the electrolyte, the salt in the electrolyte, or either of the electrodes. Typically in the prior art the limiting reactions involved oxidation or reduction of the solvent.

A major restriction on the electrolyte used in prior art electrolytic capacitors is the compatibility of the electrolyte with the paper spacer layer used to separate the anode and cathode foils from one another. The electrolyte is required to swell the paper layer so that it becomes porous to the electrolyte and also the electrolyte must be of sufficiently low resistivity such that the presence of the paper layer does not increase the internal resistance of the capacitor the extent that the capacitor is no longer useful.

Among the attempts to achieve a reduction of the volume of such electrolytic capacitors is one represented by U.S. Pat. No. 3,555,369, which suggests the replacement of the conventional Kraft paper spacer or insulator of the capacitor with a thin semipermeable membrane of a polymeric material. Such a membrane would be thin, i.e., less than 40$\mu$m thick, and preferably its thickness would be between about 1 $\mu$m and 2 $\mu$m or even less. Viewed in the abstract, this proposal might well have enabled a substantial reduction in the volume of the capacitor to be achieved because, given the normal thickness (on the order of about 100 $\mu$m or so) of the aluminium foil components of the capacitor, the size of the rolled up laminate would in essence be determined by the thickness of the foils, with the contribution of the semipermeable membrane layer to the overall thickness being, for all practical purposes, negligible. However, a capacitor according to this proposal requires that the semipermeable membrane must be impregnated with a conventional solvent-based liquid electrolyte. Thus, the electrolytic capacitor of the patent must still be sealed hermetically in order to prevent any leakage of the electrolyte from the capacitor, and that in turn necessitates the provision of an expansion or compliance chamber to accommodate the gases liberated by the conventional electrolyte. As noted above, the provision of such a chamber negates the volume reduction achieved by the use of the thin spacer constituted by the semipermeable membrane. Further, the presence of the conventional electrolyte in the electrolytic capacitor according to this patent will subject the capacitor to the previously described deformation of the oxide dielectric layer on the anode, and at the same time the presence of the electrolyte will tend to adversely affect the lifetime of the formed oxide layer of the capacitor.

Some prior art electrolytes (such as that described in International Patent Application No. PCT/AU88/00126, of Specialised Conductives Pty. Ltd. by MacFarlane et al. which corresponds to United States patent application Ser. No. 187,239, now U.S. Pat. No. 4,942,501) achieve reduced tendency to degrade via the use of a solid polymer electrolyte. Such solid polymer electrolytes have relatively high resistivities. The capacitors obtained therefrom thus generally have an internal resistance which may be somewhat higher than desireable, especially at low temperatures, thus making the capacitors unsuitable for certain applications.

U.S. Pat. No. 4,774,011 describes an electrolyte based on quaternary phosphonium ion salts where the electrolyte is composed mainly of an aprotic solvent. A series of solvents are identified including butyrolactam and a group of amides. Such electrolytes do not display the properties of low leakage current, high shelf stability, and low hydrogen gas evolution. This patent teaches that small amounts of other solutes may be added to reduce leakage current, reduce electrolytic corrosion (which is related to shelf like), and to generally improve properties.

U.S. Pat. No. 4,715,976 is similar in its disclosure to U.S. Pat. No. 4,774,011. In this case the salt is a family of quaternary ammonium compounds. Again, such electrolytes are deficient in leakage current, hydrogen gas evolution, shelf factor, and other important properties since extra solutes are necessary to suppress these effects.

U.S. Pat. No. 4,786,428 discloses a family of salts which improve the reliability and performance of electrolytic capacitors. The salts are used in combination with an aprotic solvent, a range of which are specified. The salts identified are all bisamine compounds. Such electrolytes form capacitors which are deficient in leakage current, hydrogen gas evolution, shelf factor and other important properties. The majority of those specified are protic compounds. The disclosure makes mention of drying of the salt under vacuum.

U.S. Pat. No. 4,786,429 discloses a family of salts which provide increased temperature range of operation of an electrolytic capacitor. The solvent specified is of the aprotic type, and is preferably composed mainly of $\gamma$-butyrolactone. Such salt/solvent combinations yield protic electrolytes because many of the salts identified contain protic groups themselves and all those specified as examples also contain water as part of the structure of the salt molecule. Such water will become active as a protic component once in solution.

It is an object of the present invention, therefore, to provide novel and improved capacitors which, by virtue of their features, avoid the hereinbefore mentioned as well as other drawbacks and disadvantages of heretofore known electrolytic and quasi-electrolytic capacitors.

It is also an object of the present invention to provide methods for making high stability capacitors and the electrolytes use therein.

It is another object of the present invention to provide a capacitor electrolyte which has a much improved voltage range of stability, so that the operating voltage range of the capacitor can be improved.

It is a further object of the present invention to provide an electrolyte which has a much reduced tendency to produce hydrogen gas during operation in an aluminium electrolytic capacitor.

It is yet another object of the present invention to provide a means for separating the anode and cathode electrodes without the use of an intervening paper layer.

It is still another object of the present invention to provide a capacitor having low internal resistance, especially at low temperatures, and which is inexpensive to manufacture.

In accordance with the invention novel and improved capacitors are provided having a structure which is characterized by the presence, between the anode and the cathode thereof, of a layer of electrolyte constituted of a solution of certain salts in a solvent of high stability, whereby such capacitors are characterized by having improved stability and oxide layer re-forming properties leading to a longer shelf life as well as a longer useful service life, by a relatively higher working voltage, by having a much reduced tendency to generate hydrogen during use, by being immune to any leakage of electrolyte, and by having a volume appreciably smaller than that of the heretofore smallest available electrolytic capacitors of comparable constructional and operational properties.

Generally speaking, the objects of the present invention are attained by a compact electrolytic capacitor which includes, between the electrically conductive anode and cathode thereof, an electrolyte comprising a solution of (a) at least one salt selected from the group consisting of alkali metal salts, transition metal salts, ammonium and ammonium derivative salts, zinc salts, cadmium salts, mercury salts, lead salts, bismuth salts and thallium salts of (b) at least one acid selected from the group consisting of monobasic, dibasic and tribasic acids (c) in an aprotic solvent.

The aprotic solvent in the electrolyte according to the present invention is made from a solvent with polar groups capable of imparting to the solvent a high solvation power for the purpose of ions. However, the polar groups must not include those having labile hydrogen atoms. Such polar, non-labile hydrogen containing solvents are often termed aprotic solvents. Potentially any member of this class of compound is operable in the present invention. However, the particular solvent which is optimal will depend on the application. The physical form of these solvents can vary from fluid liquid, through viscous liquid to plastic liquid, liquid crystal, crystalline solid or elastomeric solid depending on the nature of the compound.

The dielectric constant of these aprotic solvents varies greatly and therefore so also does their ability to dissolve significant quantities of ionizable salts as required in an electrolyte. Thus the choice of aprotic solvent is limited to those which have sufficient solubility to yield an electrolyte of sufficiently low resistance to provide a useful capacitor. The solubility is also determined to a large extent by the nature of the salt. Thus the salts disclosed herein for use in the electrolytes which are the subject of the present invention are typically the metal salts of very strong acids. The optimal salts also have relatively low lattice energies such that the crystal binding energy is easily overcome. Typical of such salts are the metal salts of perchloric acid, the metal salts of tetraflouboric acid, the metal salts of thiocyanic acid, the metal salts of trifluoromethanesulphonic acid, and the metal salts of the haloid acids. Also useful are the un-, mono-, di-, tri- or tetra-substituted ammonium salts of any of the above-mentioned acids. Further, the partial esters of boric, sulphuric or phosphoric acids with compounds containing an alcohol group can form salts useful in the present application with metals or any of the above-mentioned ammonium compounds.

While all of these salts will be more or less soluble in some of the aprotic solvents, they may not necessarily yield optimal electrolytes for capacitors. For example it is highly undesireable to have the haloid ions present in an aluminium electrolytic capacitor since these accelerate the degradation reaction. Thus these salts are far from optimal in that application. It has been found that the tetrafluoroborate salts yield particularly stable electrolytes for use in aluminium capacitors and in particular the alkali metal tetrafluoroborates are found to be optimal in terms of low resistance. The sodium salt of di(methoxytriethyleneglycol)borate is also useful in providing high stability. In capacitors of the double layer type containing high surface area carbon electrodes, it is however possible to use haloid ion salts.

In order to be operative in the present invention the aprotic solvents must usually be thoroughly dried of all moisture. Such moisture represents a second, protic solvent which seriously diminishes the performance of the present invention. Further the aprotic solvents must be purified so as to remove all protic compounds which may be present therein. Typically the purity should be at least 99.9% and preferably at least 99.99%. However, some small amount of water is needed in the electrolytic capacitor to form an aluminum oxide layer. Although not fully understood, it is believed that this small amount of water is provided by water of hydration of the aluminum oxide.

The present invention contemplates production of the electrolyte from a high solvation power solvent such as:

(i) alkyl carbonates, such as, for example, compounds having the structure:

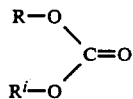

where R and $R^i$ are members of the family of the alkyl groups or hydrogen. The alkyl group family are herein defined as the groups:

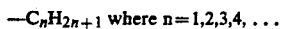

Additionally, R or $R^1$ may be members of families of groups having structures:

where X and Y are an alkyl group or H and n=1,2,3,4, ...

where Z is F, Cl, Br or I and n=1,2,3,4 ... Preferably n is less than 3 in these structures, but generally is a small integer, such as, for example, less than 10.

An example of an alkyl carbonate which is of particular utility in this invention is diethylcarbonate.

(ii) alkylene carbonates, such as, for example, compounds having the structure:

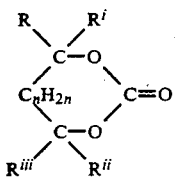

where R, $R^i$, $R^{ii}$ and $R^{iii}$ are alkyl groups or groups of the type A as hereinbefore defined or hydrogen. For example ethylene carbonate is of particular utility in this invention.

(iii) alkylene glycol derivatives, for example compounds having the structure:

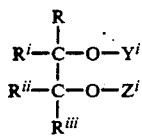

where R, $R^i$, $R^{ii}$ and $R^{iii}$ are alkyl groups or groups of the type A as hereinbefore defined or H and $Y^i$ and $Z^i$ are alkyl groups, groups of the type A as hereinbefore defined, acyl groups, or urethane groups. An example of such a compound which is of particular utility in this invention is dimethoxy ethylene glycol.

(iv) dialkylene glycol derivatives, such as, for example, compounds having the structure:

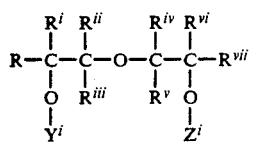

where R, $R^i$, $R^{ii}$, $R^{iii}$, $R^{iv}$, $R^v$, $R^{vi}$, $R^{vii}$ are alkyl groups or groups of the type A, or H and $Y^i$ and $Z^i$ are alkyl groups, groups of the type A, acyl groups or urethane groups. An example of a dialkylene glycol derivative which is of particular utility in this invention is dimethoxy diethyleneglycol.

(v) trialkylene glycol derivatives of the structure:

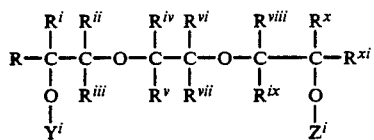

where R, $R^i$, $R^{ii}$, $R^{iii}$, $R^{iv}$, $R^v$, $R^{vi}$, $R^{vii}$, $R^{viii}$, $R^{ix}$, $R^x$, $R^{xi}$ are alkyl groups or groups of the type A, or H and $Y^i$ and $Z^i$ are alkyl groups, groups of the type A, acyl groups or urethane groups. An example of a trialkylene glycol derivative which is of particular utility in this invention is dimethoxy triethylene glycol.

(vi) poly(alkylene glycol) derivatives of the structure

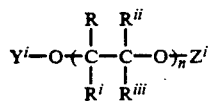

where R, $R^i$, $R^{ii}$ and $R^{iii}$ are alkyl groups or groups of the type A, or H, and $Y^i$ and $Z^i$ are alkyl groups, groups of the type A, acyl groups, or urethane groups and $n \geq 4$. An example of a poly(alkylene glycol) derivative which is of particular utility in this invention is di ω-methoxy poly(ethylene glycol) 400 Daltons. A further example is dimethoxy tetraethylene glycol.

(vii) sulphoxides, such as, for example, compounds having the structure

where R and $R^i$ are alkyl groups or groups of type A.

An example of a sulphoxide compound which is of particular utility in this invention is dimethyl-sulphoxide.

(viii) substituted amides, such as, for example, compounds having the structure:

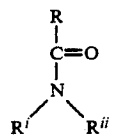

where R, $R^i$ and $R^{ii}$ are alkyl groups or groups of the type A. Additionally, R may be H. $R^i$ and $R^{ii}$ may be joined at some other point of their structure so that a cyclic group is formed.

An example of a substituted amide which is of particular utility in this invention is dimethyl acetamide.

(ix) substituted amines of the structure:

where R, $R^i$ and $R^{ii}$ are alkyl groups or groups of the type A. One or more of R, $R^i$ and $R^{ii}$ may be joined to the remaining group so that a cyclic compound is formed. An example of a substituted amime which is of particular utility in this invention is tri(methoxy ethanol)amine.

(x) cyclic ethers of the structure:

where R and $R^i$ are alkyl groups or hydrogen and n and m=1,2,3,4 ...

A particular example of a cyclic ether which is of utility in this invention is 18 crown 6.

(xi) lactams, such as, for example, compounds having the structure:

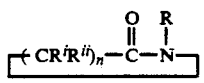

where R, $R^i$ and $R^{ii}$ are alkyl groups or are groups of the type A. Additionally, $R^i$ and $R^{ii}$ may be hydrogen. An example of a lactam which is of particular utility in this invention is caprolactam.

(xii) lactones, such as, for example, compounds having the structure:

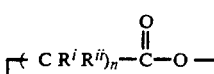

where $R^i$ and $R^{ii}$ are alkyl groups or hydrogen, or groups of the type A.

(xiii) anhydrides, such as, for example, compounds having the structure:

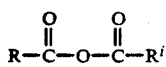

where R and $R^i$ are alkyl groups, H, groups of the type A and are possibly joined at some point to form a cyclic structure.

(xiv) esters, such as, for example, compounds having the structure:

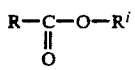

where R and $R^i$ are alkyl groups or groups of the type A. Additionally R can be H.

(xv) urethanes, such as, for example compounds having the structure:

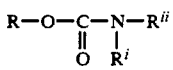

where R, $R^i R^{ii}$ are alkyl groups or groups of the type A. Additionally, $R^i$ can be H.

(xvi) Ureidos, such as, for example, compounds having the structure:

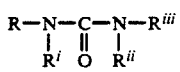

where R, $R^i$, $R^{ii}$ and $R^{iii}$ are alkyl groups, or are groups of the type A.

(xvii) nitriles, such as, for example, compounds having the structure:

where R is an alkyl group or a group of the type A.

(xviii) lactate esters, such as, for example, compounds having the structure:

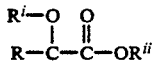

where R, $R^i$ and $R^{ii}$ are alkyl groups or a group of the type A. Additionally R can be H.

(xix) nitrile esters, such as, for example, compounds havings the structure:

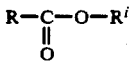

where R is an alkyl group or a group of the type A, and $R^i$ is a hydrocarbon chain containing a nitrile group.

(xx) diketones, such as, for example, compounds having the structure:

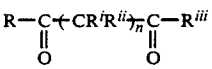

where R, $R^i$, $R^{ii}$ and $R^{iii}$ are alkyl groups, H, or groups of the type A, and n=1,2,3 ...

(xxi) siloxanes, such as, for example, compounds having the structure:

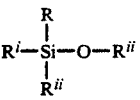

where R and $R^{ii}$, are alkyl groups or groups of the type A. $R^i$ and $R^{ii}$ may be alkyl groups or groups of the type A or may be groups containing further siloxane groups.

(xxii) any of the above-mentioned compounds in which the oxygen atoms therein are replaced with sulphur atoms.

(xxiii) any of the above-mentioned compounds in which one or more of the groups denoted R, $R^i$, $R^{ii}$, $R^{iii}$, $R^{iv}$, $R^v$, $R^{vi}$, X, Y, Z, and A themselves contain a further functional group of the types characterized by compounds (i)-(xxii) herein.

It will be appreciated that these aprotic solvents and compounds can be mixed in a variety of ways in order to obtain optimal properties for each application. In particular those which are solid in their pure form can be dissolved in a liquid aprotic compound of appropriate structure to form a solution.

The molar concentration of the salt in the electrolyte preferably is between 0.005 and 1 times that of the polar groups therein.

The anode of the capacitor preferably is in the form of a foil of any of a class of metals such as aluminium, tantalum, niobium, tungsten or other anodic metals which are commonly used in the construction of electrolytic capacitors. Aluminium foil which has been annealed and deeply etched to maximize its surface area is particularly suitable for the type of capacitor intended for use in cardiac pacemakers and defibrillators.

The cathode, which in the basic embodiments of the present invention is made of any suitable metal such as platinum, silver, gold, nickel, aluminium, or the like, can be constructed in the form of a foil of such a metal and then laminated with the anode and the solid electrolyte layer. Alternatively, it can be formed in situ as a film by painting, sputtering, evaporating, or otherwise depositing the metal directly onto that surface of the spacer layer which is directed away from the electrolyte/oxide layer interface.

The spacer in the capacitor of the present invention can be of any material having sufficient porosity to the solvent of the electrolyte. Such spacers may include Kraft paper, porous polypropylene films and polyamide mesh materials. In order to minimize the volume of the capacitor still further, the spacer can be omitted and be replaced by a pattern printed onto the surface of the cathode film. In this case the cathode film, which may be of the free standing metal foils mentioned above, is printed in a stipple or mesh pattern with a dielectric ink in such a way as to produce a pattern of thickness between 1 μm and 50 μm, but preferably between 2 μm and 20 μm. The pattern must be of sufficiently close repeat that adequate separation is maintained between the anode and cathode foils. Typically a mesh pattern of at least 100 threads per cm is sufficient.

It is further contemplated that in accordance with yet another embodiment of the present invention the principles thereof may be embodied in a capacitor, known as a double layer capacitor, which does not include an anode made of anodic metal and therefore does not include an oxide dielectric layer. Such a capacitor utilizes a porous mass of electrically conductive carbon particles embedded in a layer formation in a solid polymer electrolyte matrix to constitute the anode of the capacitor. The particles may be loose or sintered into the form of a porous body. An anodic connector foil is electrically connected to the layer of carbon particles, and an ultrathin layer of spacer material is interposed between the latter and the cathode. A capacitor of this type, since it does not use anodic metal and hence does not include a dielectric layer, is not suited for use in a high frequency or high voltage environment but has a high capacitance and low voltage capability which makes it suitable for use in a variety of applications such as an energy storage device for a miniaturized computer memory backup.

The electrolytic capacitors according to the present invention provide a number of advantages. Among these are:

1. Better Linearity of Capacitance With Applied Voltage

Generally, conventional aluminium electrolytic capacitors have an energy storage value or capacitance which increases with applied voltage. This is probably due to penetration to the liquid electrolyte into the aluminium oxide surface coating on the anode. Sometimes, however, such penetration is undesirable, as it can result in a change in the dielectric characteristics and hence in a distortion of the waveform in pulse applications. Because the capacitor of the present invention does not use a solvent capable of solvating the oxide layer, the tendency toward variation of capacitance with applied voltage is greatly reduced.

2. Higher Working Voltage

All other things being equal, the capacitor of the present invention is characterized by a higher working voltage than is normally found in conventional capacitors. An improvement in excess of 5% in working voltage results by virtue of the action of the electrolyte of the present invention. For example, if a capacitor made of a high purity etched aluminium foil and a conventional protic electrolyte has a working voltage of 360 volts DC, an identically constructed capacitor utilizing an electrolyte according to the present invention would provide an increase in the working voltage to approximately 380 volts.

3. Higher Capacitance Per Unit Area

In the capacitor of the present invention, the dielectric oxide layer cannot by hydrated or otherwise penetrated by the electrolyte; thus, a more compact oxide layer results. This produces a higher capacitance per unit area of etched anode foil than is obtained with liquid electrolytes at a given voltage. An improvement in excess of 5% over, for example, Rubycon ® capacitors results by virtue of the electrolyte of the present invention. For example, a segment of foil having a discharge capacitance of 0.74 $\mu$F per $cm^2$ in a protic electrolyte is found to have a discharge capacitance of approximately 0.81 $\mu$F per $cm^2$ in the electrolyte of the present invention.

4. Improved Shelf Factor

The electrolytic capacitors of the present invention are much less susceptible to dielectric layer breakdown because of the absence of a solvating electrolyte. Consequently, the increase of electrical leakage with age of such capacitors is substantially reduced and their shelf life is materially enhanced. For example, for capacitors using an electrolyte composition according to the invention, including sodium tetrafluoroborate, in tests at 60° C. for 1,000 hours, deformation of the oxide layer may be limited to 4% as opposed to up to 40% for prior art capacitors of the Rubycon ® type.

5. Reduced Capacitor Size

In conventional capacitors the housing requires an additional free volume serving as a compliance or expansion chamber for evolved hydrogen. A capacitor constructed from an electrolyte in accordance with the present invention, has a much reduced tendency to generate hydrogen. The compliance chamber is therefore no longer necessary. The size of the capacitor is, consequently, greatly reduced vis-a-vis that of a conventional liquid electrolyte capacitor, which is a substantial advantage where the capacitor is intended for use in a cramped environment, such as, for example, in an implantable biomedical electronic device such as a pacemaker or defibrillator, or in a miniaturized computer memory device, or the like.

6. Improved Leakage Current

Because of the decreased action of the electrolyte on the oxide layer, the leakage current at all voltages is reduced in capacitors constructed in accordance with the teachings of the present invention as compared with conventional electrolyte capacitors.

7. Improved Equivalent Series Resistance

Solid polymer electrolyte capacitors which display many of the above-mentioned advantages are generally of only moderate equivalent series resistance especially at low temperatures. Capacitors constructed in accordance with the teachings of the present invention have improved series resistance when compared to these devices.

The manufacture of electrolytic capacitors embodying the principles of the present invention is further explained by the following examples.

EXAMPLE 1

A 10 weight per cent solution of $NaBF_4$ in dimethoxytriethyleneglycol is made up and dried under vacuum at room temperature for a time period sufficient to remove all water. The solvent is thoroughly dried and purified with respect to other protic compounds prior to use by distillation over sodium metal and then storage under vacuum over silica gel for 24 hours. Under a slightly humid environment controlled by silica gel, this solution is then impregnated into an etched aluminium foil 5.3 cm × 10 cm × 100μm which has been previously formed to 400 V by standard manufacturing processes which include cleaning, etching and borate anodizing. The anode is then enfolded within a strip of aluminium cathode foil onto which a nonconducting mesh pattern has been printed. The mesh pattern may be formed of a dielectric ink. The excess electrolyte is expelled by rolling. The multilayer device so formed is then sandwiched between two acrylic plates and sealed. External connections are obtained via high purity aluminium strips 4 mm wide which are riveted to each foil. The external end of the anode connector strip is carefully cleaned of all traces of electrolyte and the device is connected to a voltage source. During initial charging an extra amount of current over and above the normal charging current is passed due to faradaic reaction at the anode. However, no gas evolution is observed at the cathode. After charging to 360 V, the leakage current is found to settle to less than 2 $\mu$A. Capacitance, ESR, and voltage rating are all found to be of similar or improved values as compared to similar devices constructed in the same way using the prior art electrolyte. The shelf factor, defined as the time to charge after storage divided by the time to charge after repeated charge up, is found to be much improved over the prior art devices.

EXAMPLE 2

The solution of example 1 is impregnated under dry conditions into a roll consisting of two strips, each 40 cm long, of anode foil rolled together with a strip of 45 cm long cathode foil onto which a mesh pattern has been printed. The roll is then encased in an aluminium can., and sealed with external connections passing through a rubber end seal. During initial charging, an extra amount of current over and above the normal charging current is passed due to faradaic reaction at the anode. However, no gas evolution is observed at the cathode. After charging to 360 V, the leakage current is found to settle to less than 15 $\mu$A. Capacitance, ESR, and voltage rating are all found to be of similar or improved values as compared to similar devices constructed in the same way using the prior art electrolyte. The shelf factor, defined as the time to charge after storage divided by the time to charge after repeated charge up, is found to be much improved over the prior art devices.

EXAMPLE 3

Devices are constructed as in Example 1 and Example 2 except that the spacer created by the printed mesh pattern on the cathode foil is replaced by a woven nylon fabric having a thread diameter of 35 m and 10 threads per centimeter. This mesh is interleaved between the cathode and anode layers.

EXAMPLE 4

Devices are constructed as in Examples 1-3 wherein the aprotic solvent is di($\omega$-methoxy dodecaoxyethylene)hexane diurethane.

EXAMPLE 5

Devices are constructed as in examples 1-4 where the salt is monosodium di(methoxytriethylene-glycol)borate.

EXAMPLE 6

A double layer capacitor is constructed by preparing a paste of high surface area carbon with any of the electrolytes mentioned in examples 1-5. The paste contains at least 20 percent by weight carbon.

Although disclosed in the context of a capacitor, the electrolyte of the present invention also has utility in a battery, since a battery incorporates the basic structure of a capacitor; that is an electrolyte disposed between an anode and a cathode.

Although the invention has been described with reference to particular embodiments, it is to be understood that this embodiment is merely illustrative of the application of the principles of the invention. Numerous modifications may be made therein and other arrangements may be devised without departing from the scope of the invention.

We claim:

1. An electrolyte comprising a solution of (a) at least one salt selected from the group consisting of alkali metal salts, transition metal salts, ammonium and ammonium derivative salts, zinc salts, cadmium salts, mercury salts, lead salts, bismuth salts and thallium salts of (b) at least one acid selected from the group consisting of monobasic, dibasic and tribasic acids (c) in an aprotic solvent substantially free of protic impurities, said aprotic solvent having polar groups which impart high solvation power to said solvent and wherein said polar groups are free of labile hydrogen atoms.

2. An electrolyte comprising a solution of (a) at least one salt selected from the group consisting of alkali metal salts, transition metal salts, ammonium and ammonium derivative salts, zinc salts, cadmium salts, mercury salts, lead salts, bismuth salts and thallium salts of (b) at least one acid selected from the group consisting of monobasic, dibasic and tribasic acids (c) in an aprotic solvent substantially free of protic impurities, wherein said acid is selected from the group consisting of perchloric acid, tetraflouboric acid, thiocyanic acid, trifluoromethanesulphonic acid and haloid acids.

3. An electrolyte comprising a solution of (a) at least one salt selected from the group consisting of alkali metal salts, transition metal salts, ammonium and ammonium derivative salts, zinc salts, cadmium salts, mercury salts, lead salts, bismuth salts and thallium salts of (b) at least one acid selected from the group consisting of monobasic, dibasic and tribasic acids (c) in an aprotic solvent substantially free of protic impurities, wherein said salts are selected from the group consisting of partial esters of at least one of boric, sulphuric and phosphoric acid reacted with compounds containing an alcohol group.

4. An electrolyte comprising a solution of an alkali metal tetrafluroborate in an aprotic solvent substantially free of protic impurities.

5. An electrolyte comprising a solution of a sodium salt of di(methoxytriethyleneglycol) borate in an aprotic solvent substantially free of protic impurities.

6. An electrolyte comprising a solution of (a) at least one salt selected from the group consisting of alkali metal salts, transition metal salts, ammonium and ammonium derivative salts, zinc salts, cadmium salts, mercury salts, lead salts, bismuth salts and thallium salts of (b) at least one acid selected from the group consisting of monobasic, dibasic and tribasic acids (c) in an aprotic solvent substantially free of protic impurities, wherein said solvent comprises at least one of the group consisting of alkyl carbonates, alkylene carbonates, alkylene glycol derivatives, dialkylene glycol derivatives, trialkylene glycol derivatives, poly(alkylene glycol) derivatives, sulphoxides, substituted amides, substituted amines, cyclic ethers, lactams, lactones, anhydrides, esters, urethanes, ureidos, nitriles, lactate esters, nitrile esters, diketones and siloxanes,
wherein in any of said compounds the oxygen atoms are replaced with sulphur atoms.

7. A method for forming an electrolyte comprising the steps of:
purifying an aprotic solvent so that it is substantially free of protic impurities,
dissolving a salt in the solvent to form a solution,
impregnating the solution into an etched aluminum anode foil,
providing a conductive cathode;
assembling said cathode to said impregnated anode;
providing between said anode and said cathode a low conductivity spacer with openings therein, to thereby form a capacitor.

8. The method of claim 7 wherein the step of providing a low conductivity spacer comprises applying a dielectric ink or said cathode.

9. The method of claim 7 wherein the step of providing a low conductivity spacer comprises interleaving a mesh between said anode and said cathode.

10. The method of claim 9 wherein said mesh is formed of a polymer.

11. The method of claim 10 wherein said polymer is a woven nylon.

12. The method of claim 7 further comprising the step of expelling excess electrolyte from between said anode and said cathode.

13. The method of claim 12 wherein said expelling is performed by rolling.

14. The method of claim 7 further comprising the step of forming a multilayer device having multiple anodes and multiple cathodes and assembling the layers between two insulating plates to form a multilayer assembly.

15. The method of claim 7 further comprising the steps of providing a first electrical conductor for connection to said anode, providing a second electrical conductor for connection to said cathode, and sealing the resulting assembly to form a sealed assembly so that said first conductor and said second conductor extend outside of said sealed assembly.

16. The method of claim 15 further comprising charging said capacitor to fully form a dielectric layer on said anode.

17. A method for forming an electrolyte comprising the steps of:
purifying an aprotic solvent so that it is substantially free of protic impurities, and dissolving a salt in the solvent to form a solution;
preparing a paste of high surface area carbon particles,
forming at least one electrode from said paste; and
placing said at least one electrode in contact with said electrolyte to form at least part of a double layer capacitor.

* * * * *